(12) United States Patent
Komiya

(10) Patent No.: US 7,526,910 B2
(45) Date of Patent: May 5, 2009

(54) CABLE OR THE LIKE PROTECTION AND GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 473 days.

(21) Appl. No.: 11/400,649

(22) Filed: Apr. 7, 2006

(65) Prior Publication Data
US 2006/0289188 A1 Dec. 28, 2006

(30) Foreign Application Priority Data
Jun. 23, 2005 (JP) .............................. 2005-183277

(51) Int. Cl.
*F16G 13/16* (2006.01)
(52) U.S. Cl. ...................... 59/78.1; 59/900; 248/49; 248/51
(58) Field of Classification Search ............ 59/78.1, 59/900; 248/49, 51
See application file for complete search history.

(56) References Cited

U.S. PATENT DOCUMENTS

| | | | | |
|---|---|---|---|---|
| 5,020,313 A * | 6/1991 | Moritz et al. | ............... | 59/78.1 |
| 5,860,274 A * | 1/1999 | Saleh et al. | ............... | 59/78.1 |
| 6,156,974 A * | 12/2000 | Blase | ............... | 59/78.1 |
| 6,173,560 B1 * | 1/2001 | Weber | ............... | 59/78.1 |
| 6,425,238 B1 * | 7/2002 | Blase | ............... | 59/78.1 |
| 6,615,573 B2 * | 9/2003 | Blase | ............... | 59/78.1 |
| 7,310,936 B2 * | 12/2007 | Saiki et al. | ............... | 59/78.1 |

FOREIGN PATENT DOCUMENTS

JP 03-096738 4/1991
JP 06-023589 2/1994

* cited by examiner

*Primary Examiner*—David B Jones
(74) *Attorney, Agent, or Firm*—Woodling, Krost and Rust

(57) ABSTRACT

A cable or the like protection and guide device is disclosed and claimed. The shape of a shoe, which is mounted on the cable or the like protection and guide device, and a structure of a mounting portion on a cable or the like protection and guide device side, are simplified, the collision sound generated when shoes slide on each other is suppressed and the endurance of the shoe is improved whereby a long life is obtained. The above-mentioned problems are solved by a cable or the like protection and guide device, characterized in that a shoe is provided on the flexion inner circumferential side of each link plate, a front end portion and a rear end portion of the shoe and a side wall portion of the shoe having a hook, which engages with a concave portion provided on a side plate of the link plate are molded by a soft resin and a center portion of the shoe having a protrusion portion inserted into an insertion opening provided in a upper end surface of the link plate is molded by a hard resin, that is by use of a two-color molding process.

2 Claims, 6 Drawing Sheets

CABLE OR THE LIKE PROTECTION AND GUIDE DEVICE

This patent application claims priority to Japanese Patent Application 2005-183277 filed Jun. 23, 2005.

TECHNICAL FIELD

The present invention relates to a cable or the like protection and guide device, which safely, reliably protects and guides a flexible cable(s) or the like such as an electric cable, which connects a movable portion and a stationary portion to each other in an industrial machine and a vehicle to transmit electric signals or supply power, and a hose, which supplies oil pressure or air pressure and the like.

BACKGROUND TECHNOLOGY

This type of the conventional cable or the like protection and guide device has a configuration that a number of link frame bodies each comprising a pair of right and left spaced link plates and connecting plates respectively bridged on a flexion outer circumferential side and a flexion inner circumferential side of the link plate are connected to each other in the longitudinal direction of the device while restricting a flexion radius to a fixed value or more.

And when the cable or the like protection and guide device is used while being folded in the longitudinal direction of the device in a long span, it has been feared that a flexion inner circumferential side of the cable or the like protection and guide device, positioned on a lower side is directly brought into contact with an inner circumferential side of the cable of the like protection and guide device, positioned on a upper side by being folded, so that noise and wear are generated. Thus, a cable or the like protection and guide device in which a flexion inner circumferential side of the link plate is provided with a shoe has been known (see for example Patent Reference 1).

Patent Reference 1 is Japanese Patent Publication No. Hei. 6-23589.

PROBLEMS TO BE SOLVED BY THE INVENTION

However, the above-mentioned related art needed special design ideas in shapes and structures for structurally mounting the shoe as shown in FIG. 6. Further, it has been feared that the use of a wear resistance-improved resin material hardens the shoe and becomes impossible to deform a hook in an engagement portion so that the shoe is broken at the time of mounting the device or dismounting thereof. Further, since the shoe is hard, it has been feared that collision sound is generated during sliding of the device Accordingly, the object of the present invention is to provide a cable or the like protection and guide device, in which a shape of a shoe, which is mounted on the cable or the like protection and guide device, and a structure of a mounting portion on a cable or the like protection and guide device side, are simplified, the collision sound generated when shoes slide on each other is suppressed and the endurance of the shoe is improved whereby a long life is obtained.

MEANS FOR SOLVING THE PROBLEMS

The invention according to claim 1 solves the above-mentioned problems by a cable or the like protection and guide device in which a number of link frame bodies each comprising a pair of right and left spaced link plates and connecting plates respectively bridged on a flexion outer circumferential side and a flexion inner circumferential side of the link plate are connected to each other in the longitudinal direction of the device while restricting a flexion radius to a fixed value or more, characterized in that a shoe is provided on said flexion inner circumferential side of each link plate, a front end portion and a rear end portion of said shoe and a side wall portion of said shoe having a hook, which engages with a concave portion provided on a side plate of said link plate are molded by a soft resin and a center portion of said shoe having a protrusion portion inserted into an insertion opening provided in an upper end surface of said link plate is molded by a hard resin, that is by use of a two-color molding process.

It is noted that the concave portion provided on a side surface of said link plate may be a through hole, which penetrates to an insertion opening provided on an upper end portion of the link plate.

Further, the invention according to claim 2 solves the above-mentioned problems by a cable or the like protection and guide device in which a number of link frame bodies each comprising a pair of right and left spaced link plates and connecting plates respectively bridged on a flexion outer circumferential side and a flexion inner circumferential side of the link plate are connected to each other in the longitudinal direction of the device while restricting a flexion radius to a fixed value or more, characterized in that a shoe is provided on said flexion inner circumferential side of each link plate, a front end portion and a rear end portion of said shoe and a side wall portion of said shoe having a hook, which engages with a concave portion provided on a side plate of said link plate are molded by a soft resin and a center portion of said shoe having a protrusion portion inserted into an insertion opening provided in an upper end surface of said link plate is insertion-molded by metal.

EFFECTS OF THE INVENTION

According to the invention of claim 1, since, in a cable or the like protection and guide device in which a number of link frame bodies each comprising a pair of right and left spaced link plates and connecting plates respectively bridged on a flexion outer circumferential side and a flexion inner circumferential side of the link plate are connected to each other in the longitudinal direction of the device while restricting a flexion radius to a fixed value or more, a shoe is provided on said flexion inner circumferential side of each link plate, a front end portion and a rear end portion of said shoe and a side wall portion of said shoe having a hook, which engages with a concave portion provided on a side plate of said link plate are molded by a soft resin and a center portion of said shoe having a protrusion portion inserted into an insertion opening provided in an upper end surface of said link plate is molded by a hard resin, that is by use of a two-color molding process, collision sound generated when shoes slide on each other can be suppressed in a low level, resulting in improvement of quietness. Further, since a side wall portion having a hook, which engages with the link of a shoe, is molded by a soft resin, the breakage of the shoe at the engagement, mounting and dismounting are prevented. Further, in the center portion of the shoe a hard resin may be selected without considering easy mounting and dismounting of the shoe portion, whereby flexibility of design is increased.

According to the invention of claim 2, since, in a cable or the like protection and guide device in which a number of link frame bodies each comprising a pair of right and left spaced link plates and connecting plates respectively bridged on a flexion outer circumferential side and a flexion inner circumferential side of the link plate are connected to each other in the longitudinal direction of the device while restricting a flexion radius to a fixed value or more, a shoe is provided on said flexion inner circumferential side of each link plate, a front end portion and a rear end portion of said shoe and a side wall portion of said shoe having a hook, which engages with a concave portion provided on a side plate of said link plate are molded by a soft resin and a center portion of said shoe having a protrusion portion inserted into an insertion opening provided in an upper end surface of said link plate is insertion-molded by metal, in addition to the effects exhibited by claim 1, the wear of the shoe can be further prevented.

A better understanding of the drawings will be had when reference is made to the Description Of The Invention and Claims which follow hereinbelow.

DESCRIPTION OF THE INVENTION

Figure 1:
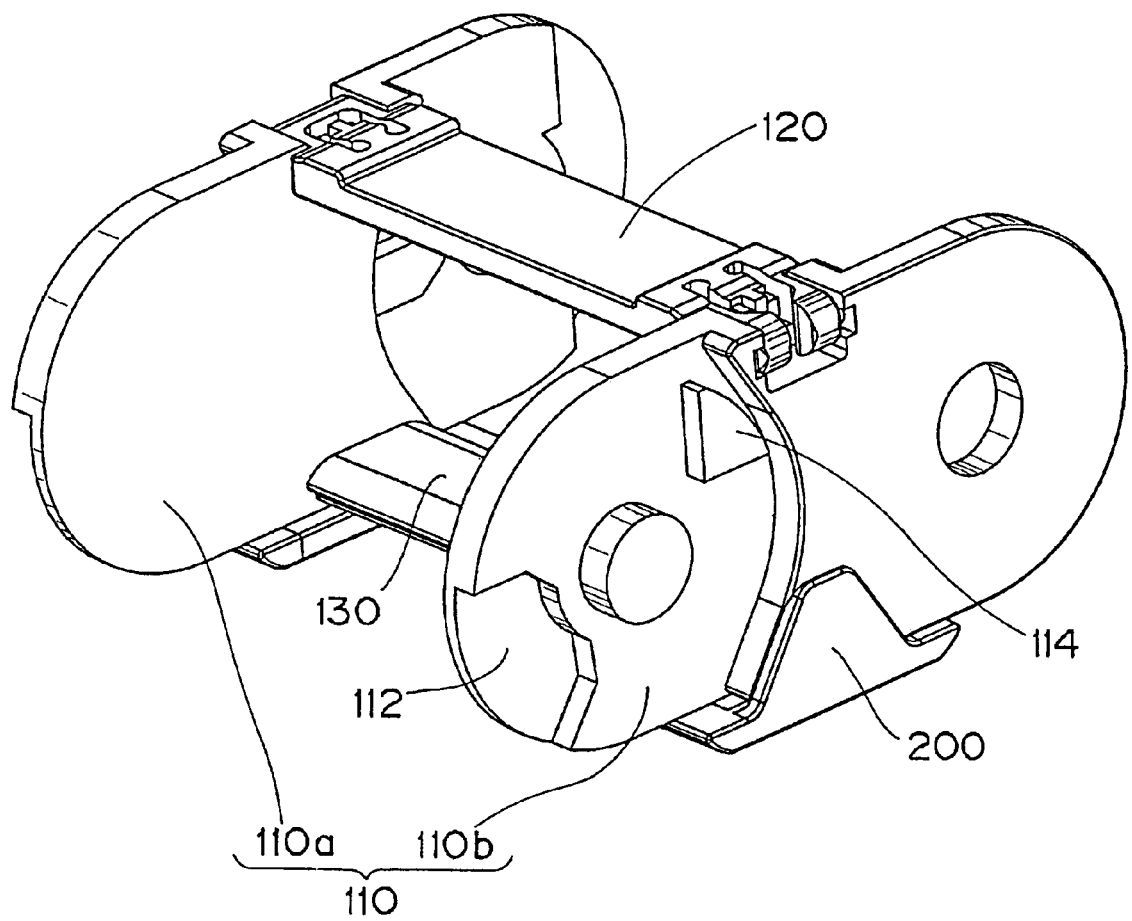
FIG. 1 is a perspective view showing a link frame body of a cable or the like protection and guide device of the present invention.
Figure 2:
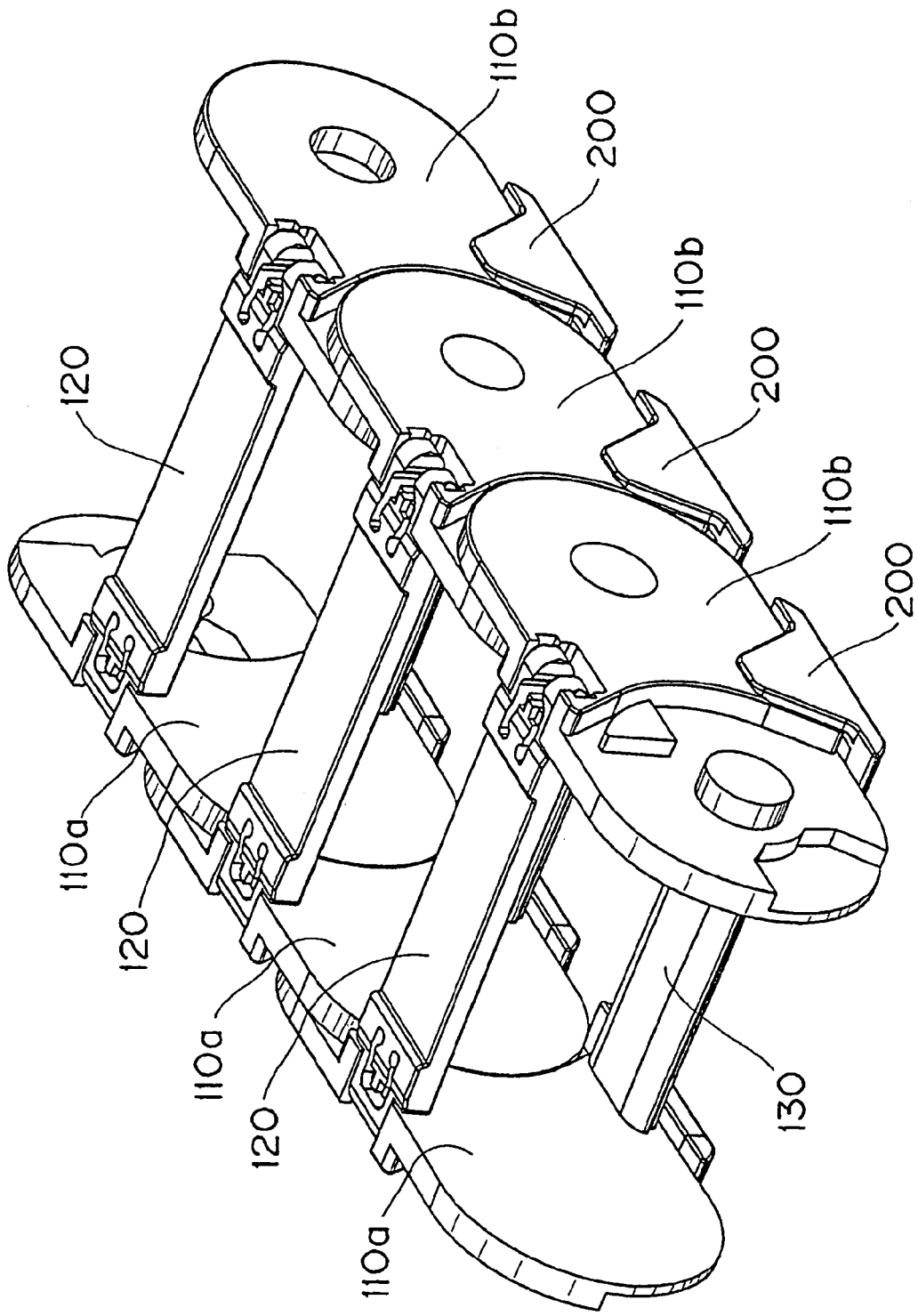
FIG. 2 is a perspective view showing three series of link frame bodies in the cable or the like protection and guide device of the present invention.

The best mode for carrying out the invention will be described based on drawings and the description herein. FIG. 1 is a perspective view showing one of link frame bodies, which form the present invention. This link frame body has a pair of right and left spaced link plates 110a and 110b, a connecting plate 120 bridged on a flexion outer circumferential side and a connecting plate 130 bridged on a flexion inner circumferential side of the link plate 110. Further, a cutout portion 112 and a convex portion 114 will be described. Namely, when a link frame body is connected to another link frame body, the cutout portion 112 is engaged with a convex portion of the another link frame body and the convex portion 114 is engaged with a cutout portion of another link frame body, whereby the cutout portion 112 and the convex portion 114 restrict a flexion radius to a fixed value or more in the longitudinal direction of the device. FIG. 2 is a perspective view showing a state where three link frame bodies are connected to each other.

The materials forming the above-mentioned link plates 110 and the connecting plates 120, 130 are not limited particularly. However, it is preferred that they are molded by use of a glass-fiber-reinforced polyamide resin, which can exhibit excellent strength properties.

Figure 3:
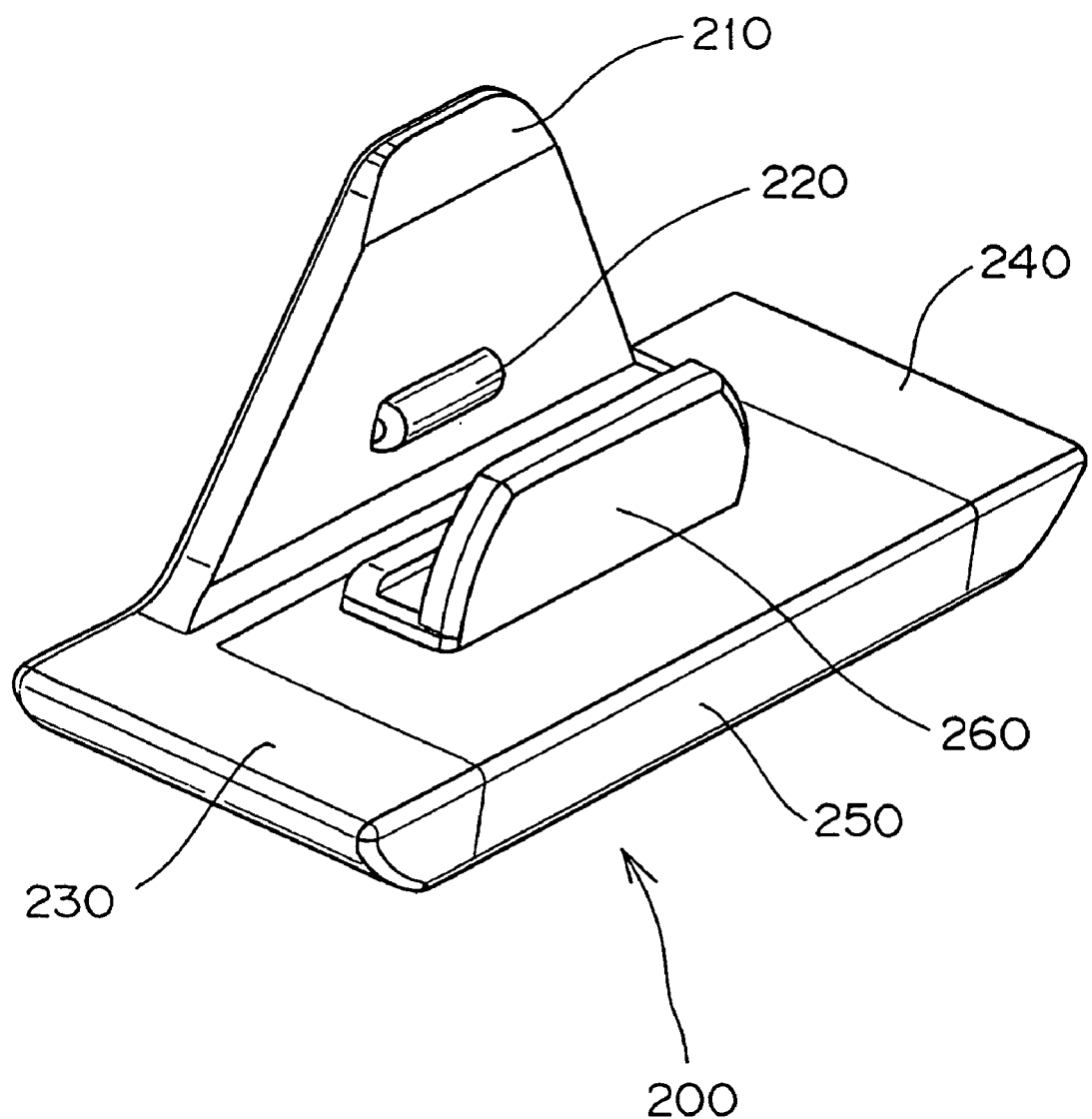
FIG. 3 is a perspective view showing a shoe in the cable or the like protection and guide device of the present invention.

Next, the most characteristic shoe 200 of a cable or the like protection and guide device according to the present invention will be described in detail. The shoes 200 are mounted on a flexion inner circumferential side of link frame bodies connected as shown in FIGS. 1 and 2. FIG. 3 is a perspective view of a shoe 200 dismounted from the link frame body. This shoe includes a front end portion 230, a rear end portion 240 and a side wall portion 210 having a hook 220, which engages with a concave portion provided on a side surface of the link plate 110. And these members are molded by for example a soft elastomeric resin. On the other hand, a center portion 250 of the shoe 200 having a protrusion portion 260 inserted into an insertion opening provided in a upper end surface of the link plate 110 is molded by a hard resin such as polyamide, polyacetal or the like. And the soft resin and the hard resin are integrated by a two-color molding process.

Further, the center portion 250 of the shoe 200 may be molded by metal such as stainless steel, carbon steel or the like in place of the hard resin. And in this case, said soft resin and the metal may be integrated by an insert molding process.

Figure 4:
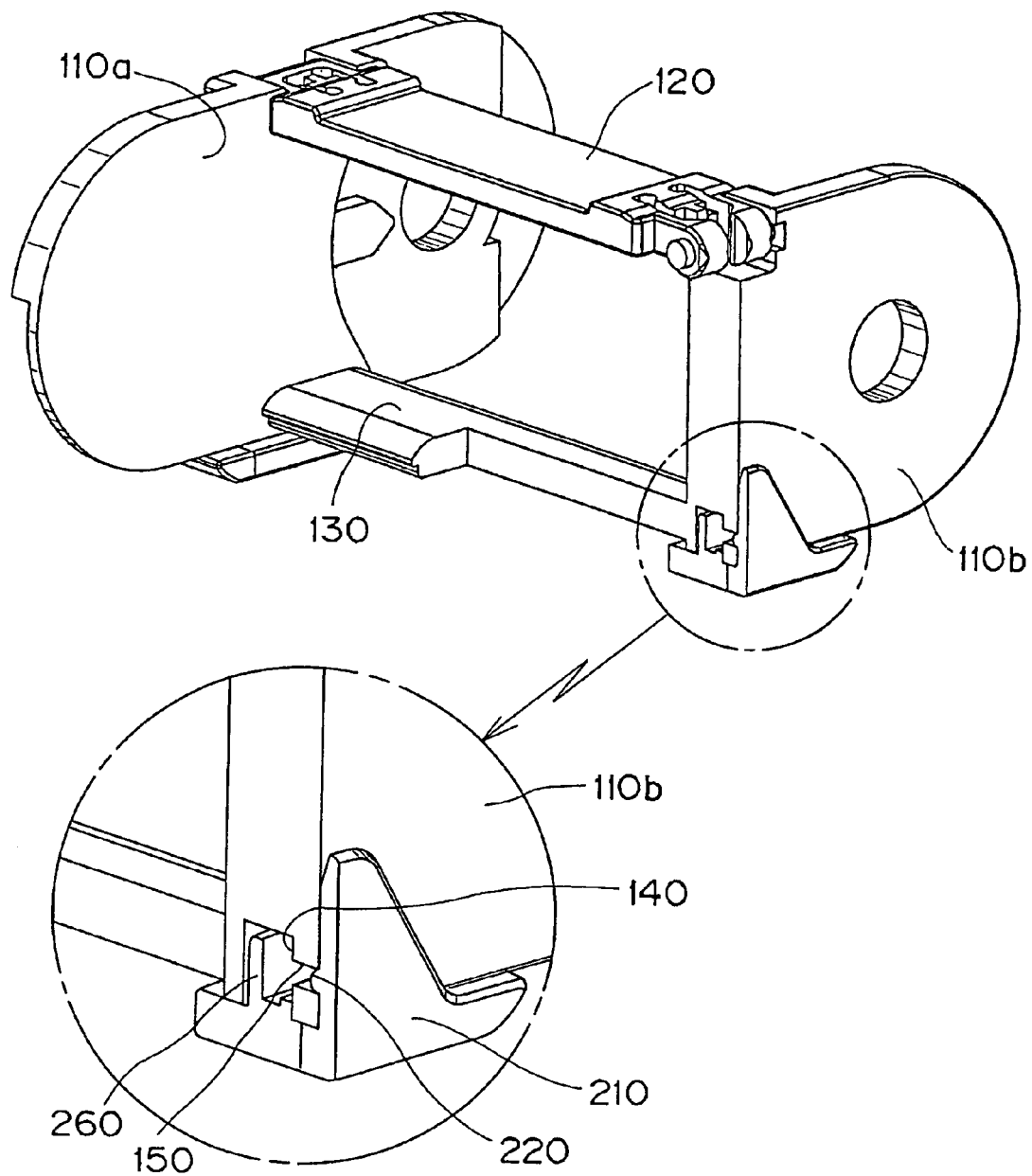
FIG. 4 is a perspective view in which a part showing a state of the mounting of a shoe is cut.

Next, a mounting method of said shoe 200 onto a link frame body will be described with reference to FIG. 4. FIG. 4 is a perspective view showing a state where a part of both a near side link plate 110b and a connecting plate 130 is bridged on a flexion inner circumferential side is cut. An end surface of the flexion inner circumferential side of the link plate 110b is provided with an insertion opening 140 into which the protrusion portion 260 of the shoe 200 is inserted. And a side surface of the link plate 110b is provided with a concave portion 150, which engages with a hook 220 provided on a side wall portion 210 of the shoe 200.

And the side wall portion 210 of a soft resin is once flexed backward at the mounting of the shoe 200 so that the hook 220 is engaged with the concave portion 150 provided on the side surface of the link plate 110b to remove flexion of the side wall portion 210. Further, since the hook 220 itself, which engages with the concave portion 150 provided in a side surface of the link plate 11b, is made of a soft resin and can be sufficiently deformed, the dismounting of the shoe is easy and also the assembly of the cable or the like protection and guide device is easy, and further the breakage of the shoe can be prevented.

Figure 5:
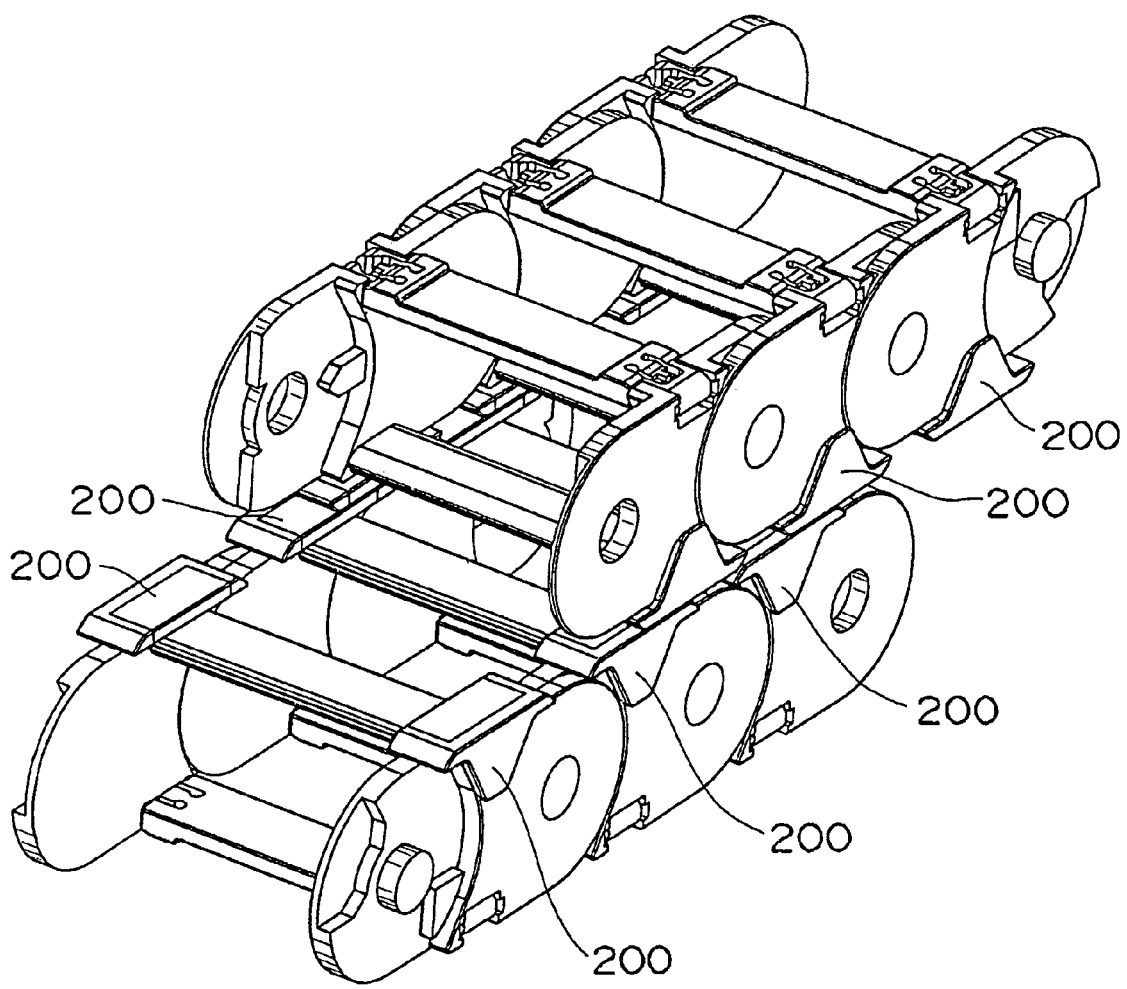
FIG. 5 is a perspective view of a state where the cable or the like protection and guide device of the present invention is slid between the upper and lower portions.
Figure 6:
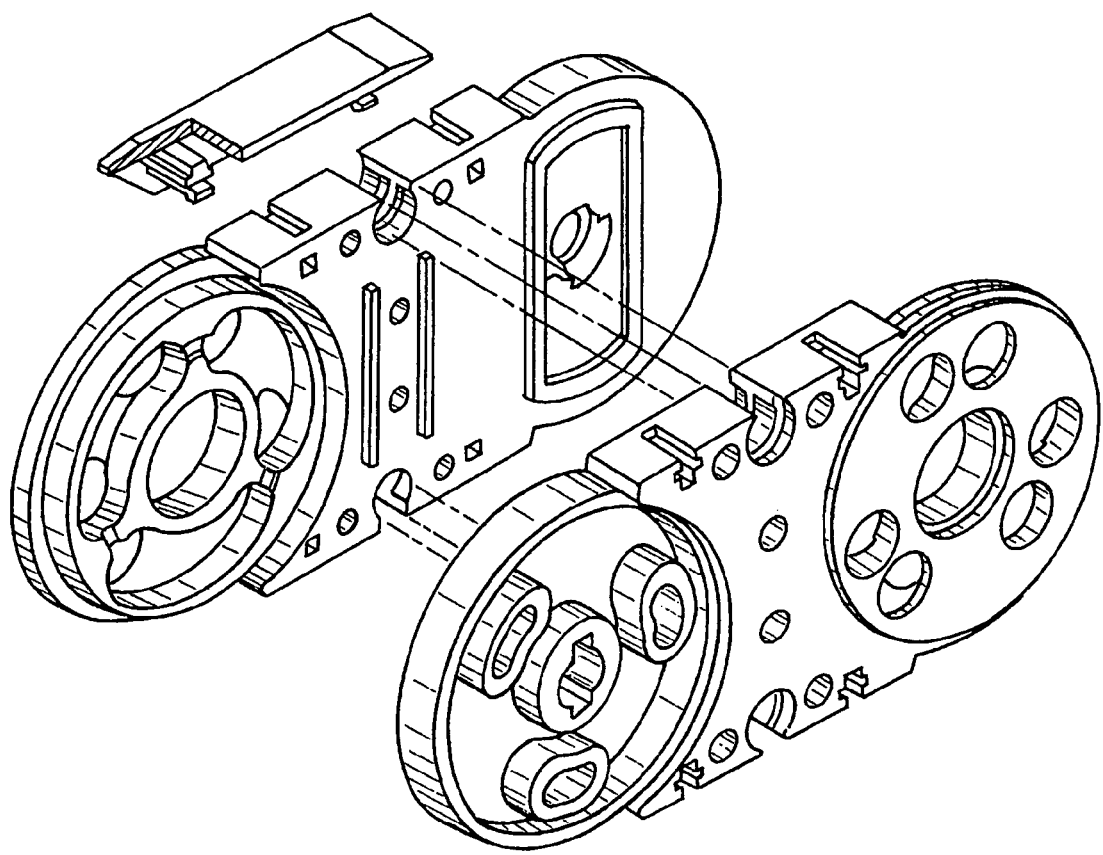
FIG. 6 is a side view showing a conventional cable or the like protection and guide device.

FIG. 5 is a perspective view showing a state where when a cable or the like protection and guide device is used while being folded in the longitudinal direction of the device in a long span, a flexion inner circumferential side of a cable or the like protection and guide device positioned on a lower side and a flexion inner circumferential side of the cable or the like protection and guide device positioned on a upper side are brought into direct contact with each other. On the flexion inner circumferential side of the cable or the like protection and guide device is mounted a shoe every link frame body as mentioned above. Thus when a cable or the like protection and guide device is used while being folded in the longitudinal direction, the shoes are slid on each other. In this case, since the front end portions 230 of soft resin shoes 200 first make sliding contact with each other, collision of hard resin members or metal members at the center portions is prevented and the generation of the collision sound can be suppressed.

DESCRIPTION OF REFERENCE NUMERALS 100a, 110b . . . Link plate
112 . . . Cutout portion
114 . . . Convex portion
120, 130 . . . Connecting plate
140 . . . Insertion opening
150 . . . Concave portion
200 . . . Shoe
210 . . . Side wall portion (of shoe)
220 . . . Hook (of shoe)
230 . . . Front end portion (of shoe)
240 . . . Rear end portion (of shoe)

250 . . . Center portion (of shoe)
260 . . . Protrusion portion (of shoe)

Those skilled in the art will readily recognize that the invention has been disclosed by way of example and that many changes may be made to the examples without departing from the spirit and scope of the attached claims.

The invention claimed is:

1. A cable protection and guide device comprising: a number of pairs of right and left spaced link plates are articulately connected to each other in a longitudinal direction enabling said link plates to form a flexional circumferential bend having a flexional inner circumferential side and flexional outer circumferential side; each of said link plates includes a flexional inner circumferential side residing during bending on said flexional inner circumferential side of said bend; each of said link plates includes an outer circumferential side residing during bending on said outer flexional circumferential side of said bend; each of said link plates includes a concave portion; connecting plates are bridged over said flexional inner circumferential sides and said flexional outer circumferential sides of said link plates; said pairs of right and left spaced link plates are connected to each other; each of said pairs of right and left spaced link plates include flexional restricting means for limiting flexional movement during bending; a shoe; said shoe includes a front end portion, a rear end portion, a center portion having a protrusion portion and a side wall portion; said side wall portion of said shoe is formed of soft resin enabling flexibility of said side wall; said side wall portion of said shoe includes a hook formed of soft resin enabling flexibility of said hook; said center portion is formed of hard resin; said protrusion portion of said center portion formed of hard resin; said hook of each of said shoes interengages said concave portion of each of said link plates; each of said link plates includes an insertion opening, said link plate being molded from a hard resin; said protrusion portion of said shoe residing in said insertion opening of said link plate; and, said shoe removably attached to said flexional inner circumferential side of each said link plate.

2. A cable protection and guide device comprising: a number of pairs of right and left spaced link plates are articulately connected to each other in a longitudinal direction enabling said link plates to form a flexional circumferential bend having a flexional inner circumferential side and flexional outer circumferential side; each of said link plates includes a flexional inner circumferential side residing during bending on said flexional inner circumferential side of said bend; each of said link plates includes an outer circumferential side residing during bending on said outer flexional circumferential side of said bend; each of said link plates includes a concave portion; connecting plates are bridged over said flexional inner circumferential sides and said flexional outer circumferential sides of said link plates; said pairs of right and left spaced link plates are connected to each other; each of said pairs of right and left spaced link plates include flexional restricting means for limiting flexional movement during bending; a shoe; said shoe includes a front end portion, a rear end portion, a center portion having a protrusion portion and a side wall portion; said side wall portion of said shoe is formed of soft resin enabling flexibility of said side wall; said side wall portion of said shoe includes a hook formed of soft resin enabling flexibility of said hook; said center portion is formed of metal; said hook of each of said shoes interengages said concave portion of each of said link plates; each of said link plates includes an insertion opening, said link plate being molded from a hard resin; said protrusion portion of said shoe residing in said insertion opening of said link plate; and, said shoe removably attached to said flexional inner circumferential side of each said link plate.

\* \* \* \* \*